(12) United States Patent
Marvin

(10) Patent No.: US 11,178,819 B2
(45) Date of Patent: Nov. 23, 2021

(54) MODULARIZED HYDRAULIC SYSTEM FOR AGRICULTURAL COMBINE

(71) Applicant: Deere & Company, Moline, IL (US)

(72) Inventor: Paul D. Marvin, DeWitt, IA (US)

(73) Assignee: DEERE & COMPANY, Moline, IL (US)

( * ) Notice: Subject to any disclaimer, the term of this patent is extended or adjusted under 35 U.S.C. 154(b) by 196 days.

(21) Appl. No.: 16/256,503

(22) Filed: Jan. 24, 2019

(65) Prior Publication Data
US 2020/0236851 A1 Jul. 30, 2020

(51) Int. Cl.
| | | |
|---|---|---|
| *A01D 41/127* | (2006.01) | |
| *F15B 21/08* | (2006.01) | |
| *A01D 41/14* | (2006.01) | |
| *F15B 15/18* | (2006.01) | |

(52) U.S. Cl.
CPC ....... *A01D 41/1274* (2013.01); *A01D 41/141* (2013.01); *F15B 21/08* (2013.01); *F15B 15/18* (2013.01)

(58) Field of Classification Search
CPC combination set(s) only.
See application file for complete search history.

(56) References Cited

U.S. PATENT DOCUMENTS

| | | |
|---|---|---|
| 4,487,004 A | 12/1984 | Kejr |
| 8,001,751 B2 | 8/2011 | Ehrhart et al. |
| 8,783,025 B2 | 7/2014 | Hindman et al. |
| 9,717,179 B2 | 8/2017 | Trowbridge |

(Continued)

FOREIGN PATENT DOCUMENTS

| | | |
|---|---|---|
| RU | 2013115813 A | 10/2014 |
| WO | 2017201452 A1 | 11/2017 |

OTHER PUBLICATIONS

John Deere Technical Manual excerpt regarding Group 5—Theory of Operation, pp. 9025-05-1-9025-05-21, Hydraulic and Loader System of Operation, Jan. 4, 2019. (21 pages).

(Continued)

*Primary Examiner* — Hussein Elchanti
(74) *Attorney, Agent, or Firm* — Klintworth & Rozenblat IP LLP

(57) ABSTRACT

A distributed electrohydraulic system includes an electrical power source, electrohydraulic modules, and a control system. Each of the electrohydraulic modules includes one or more hydraulic components and one or more electrically-operated components which affect an operation of the one or more hydraulic components. The one or more hydraulic components of each of the electrohydraulic modules is hydraulically isolated from the one or more hydraulic components of another one of the electrohydraulic modules The one or more electrically-operated components of each of the electrohydraulic modules is electrically coupled to the electrical power source to receive electrical power. The control system includes one or more processors and memory devices electrically coupled to the electrical power source and the one or more electrically-operated components of the electrohydraulic modules. The control system is configured to execute commands to operate independently the one or more electrically-operated components of each of the electrohydraulic modules.

20 Claims, 11 Drawing Sheets

(56) References Cited

U.S. PATENT DOCUMENTS

| | | | |
|---|---|---|---|
| 2009/0038186 A1* | 2/2009 | Osswald | E02F 3/96 37/413 |
| 2011/0036281 A1* | 2/2011 | Beaujot | A01B 63/16 111/149 |
| 2012/0216871 A1* | 8/2012 | Hindman | F15B 11/17 137/1 |
| 2014/0162737 A1* | 6/2014 | Stan | A01F 12/444 460/1 |
| 2014/0183111 A1* | 7/2014 | Johnson | B01J 20/10 210/109 |
| 2015/0037448 A1* | 2/2015 | Schultz | B29C 45/76 425/162 |
| 2016/0106037 A1* | 4/2016 | Lee | A01D 41/145 56/208 |
| 2017/0027103 A1* | 2/2017 | Grotelueschen | A01C 23/047 |
| 2018/0087540 A1* | 3/2018 | Cadman | F15B 13/024 |
| 2018/0100521 A1* | 4/2018 | Richer | F15B 13/06 |
| 2020/0224389 A1* | 7/2020 | Takahashi | F15B 11/00 |

OTHER PUBLICATIONS

John Deere Parts Catalog excerpt, 31 Loader, 3162 Control and Load Holding Valves, J944K Hybrid Loader, PC11360, TX1193181 A. 1, p. 815, Apr. 2016. (1 page).

* cited by examiner

MODULARIZED HYDRAULIC SYSTEM FOR AGRICULTURAL COMBINE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to distributed electrohydraulic systems in agricultural combines.

BACKGROUND OF THE DISCLOSURE

Agricultural combines utilize a large number of hydraulically powered actuators dispersed in locations all over the combine in order to move varying components of the combine to harvest crop. Typically, the hydraulic power for these actuators is supplied by a main hydraulic pump pumping hydraulic fluid from a main hydraulic reservoir, through hydraulic lines, to a main control valve, and from the main control valve, through hydraulic lines to the hydraulically powered actuators. The hydraulic lines run all over the combine to reach the dispersed hydraulically powered actuators.

SUMMARY OF THE DISCLOSURE

This disclosure provides a distributed electrohydraulic system in an agricultural combine.

In one aspect, the disclosure provides a distributed electrohydraulic system which includes an electrical power source, a plurality of electrohydraulic modules, and a control system. Each of the plurality of electrohydraulic modules includes one or more hydraulic components and one or more electrically-operated components configured to affect an operation of the one or more hydraulic components. The one or more hydraulic components of each of the plurality of electrohydraulic modules is hydraulically isolated from the one or more hydraulic components of another one of the plurality of electrohydraulic modules The one or more electrically-operated components of each of the plurality of electrohydraulic modules is electrically coupled to the electrical power source to receive electrical power. The control system includes one or more processors and memory devices electrically coupled to the electrical power source and the one or more electrically-operated components of the plurality of electrohydraulic modules. The control system is configured to execute commands to operate independently the one or more electrically-operated components of each of the plurality of electrohydraulic modules.

In another aspect, the disclosure provides an agricultural combine. The agricultural combine includes a chassis, an engine, an electrical power source, a header, and a distributed electrohydraulic system. The engine is supported by the chassis and is configured to power a plurality of wheels to affect movement of the agricultural combine. The electrical power source is supported by the chassis. The header is coupled to the chassis and is configured to harvest an agricultural crop. The distributed electrohydraulic system includes a plurality of electrohydraulic modules, and a control system. Each of the plurality of electrohydraulic modules includes one or more hydraulic components and one or more electrically-operated components configured to affect an operation of the one or more hydraulic components. The one or more hydraulic components of each of the plurality of electrohydraulic modules is hydraulically isolated from the one or more hydraulic components of another one of the plurality of electrohydraulic modules The one or more electrically-operated components of each of the plurality of electrohydraulic modules is electrically coupled to the electrical power source to receive electrical power. The control system includes one or more processors and memory devices electrically coupled to the electrical power source and the one or more electrically-operated components of the plurality of electrohydraulic modules. The control system is configured to execute commands to operate independently the one or more electrically-operated components of each of the plurality of electrohydraulic modules.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
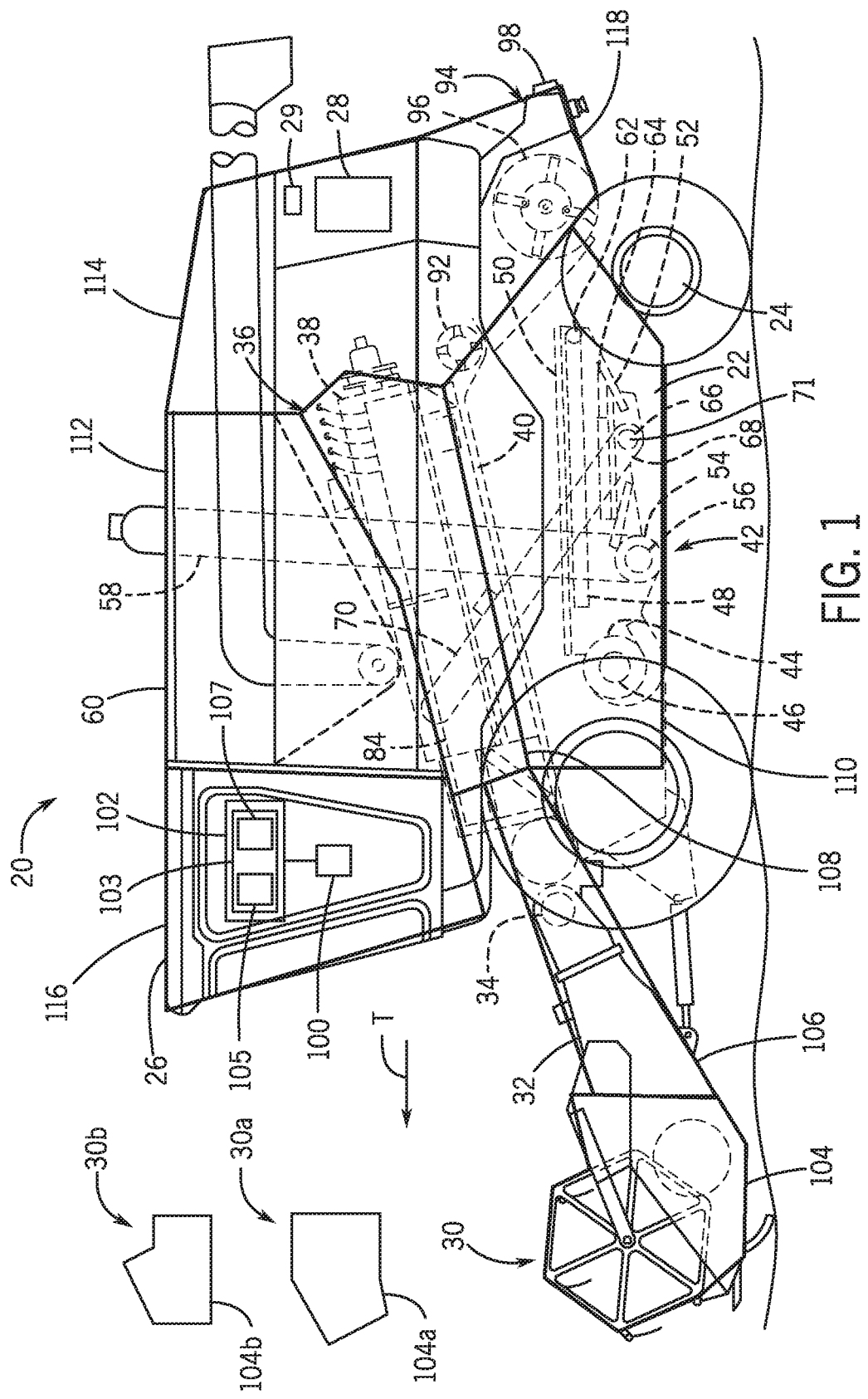
FIG. 1 is a schematic view of one example agricultural combine into which the distributed electrohydraulic system of the disclosure may be implemented.

The following describes one or more example embodiments of a distributed electrohydraulic system for an agricultural combine. Embodiments of the present disclosure are shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Agricultural combines having a large number of hydraulically powered actuators dispersed in locations throughout the combine typically requires a large number of hydraulic lines requiring a large number of interface connections. This arrangement requires a great deal of manufacturing time and cost and also significantly increases the weight of the combine due to the number of hydraulic lines. Constant electrical and hydraulic power is needed to power the hydraulically powered actuators using this arrangement. When the main hydraulic pump is down or requires servicing, all of the hydraulically powered actuators are down. To isolate a problem with one of the hydraulically powered actuators, the entire arrangement must be analyzed due to the sharing of common components. As disclosed herein, the above can be avoided by utilizing a distributed electrohydraulic system having electrohydraulic modules which do not share the same common components and are hydraulically isolated from one another in their own respective location of the combine.

In certain embodiments, the electrohydraulic modules may each have their own hydraulic components and their own electrically-operated components to operate their respective hydraulic components. The hydraulic components of each of the electrohydraulic modules may be hydraulically isolated from one another. An electrical power source may power the respective electrically-operated components. A control system may independently control the electrically-operated components.

In certain embodiments, the hydraulic components of each of the electrohydraulic modules may include a hydraulic reservoir, a hydraulic pump in communication with the hydraulic reservoir, and a hydraulic actuator coupled to the hydraulic pump.

In certain embodiments, the electrically-operated components of each of the electrohydraulic modules may include a valve to control flow from the respective hydraulic reservoir and a motor to power the respective hydraulic pump.

In certain embodiments, a main hydraulic pump, in communication with a main hydraulic reservoir, may be in communication with the hydraulic component of one of the electrohydraulic modules to affect operation of the hydraulic component. The main hydraulic pump may be hydraulically isolated from the other electrohydraulic modules, and may have a main pressure greater than the module pressure of the respective pumps of the electrohydraulic modules.

In certain embodiments, the electrohydraulic modules may include a grain tank module, a separator module, an engine deck module, a feederhouse module, a body module, and/or a header module.

In certain embodiments, the agricultural combine may include first and second headers interchangeably coupled to the combine. The first and second headers may each have respective first and second header electrohydraulic modules which are interchangeably electrically coupled to the electrical power source. The hydraulic components of each of the first and second header modules may include a hydraulic reservoir, a hydraulic pump, and a hydraulic actuator. The electrically-operated components of each of the first and second electrohydraulic modules may include a valve and a motor.

In certain embodiments, each of the electrohydraulic modules may include a sensor which senses a pressure of hydraulic fluid and/or a position of the respective hydraulic component within the electrohydraulic module.

In certain embodiments, the electrohydraulic modules may have their own respective hydraulic lines which are solely positioned in the respective electrohydraulic module and do not extend into any of the other electrohydraulic modules.

The embodiments of the disclosure may provide significant advantages. The hydraulic actuators of the electrohydraulic modules may be intermittent so that constant power is not required to run them. Due to the modular nature of the distributed electrohydraulic system, less interface connections are required across the module boundaries. This decreases manufacturing time and cost. Moreover, serviceability and problem isolation are improved due to the electrohydraulic modules having their own respective components which operate independently. As a result, when one electrohydraulic module goes down the problem can be easily isolated and the remaining electrohydraulic modules do not go down. Due to the decrease in hydraulic lines, the weight of the combine also is decreased.

FIG. 1 is a schematic view of one example agricultural combine 20 into which a distributed electrohydraulic system may be implemented. The agricultural combine 20 includes a chassis 22 with ground-engaging wheels 24 or tracks. The wheels 24 are rotatably mounted to the chassis 22 and engage with the ground to propel the agricultural combine 20 in a travel direction T. An operator cab 26, also mounted to the chassis 22, houses an operator as well as various devices to control the combine 20. The wheels 24 and other devices of the combine 20 are powered by an internal combustion engine 28.

The internal combustion engine 28 is supported by the chassis 22 and configured to power the wheels 24 to affect movement of the agricultural combine 20. An electrical power source 29, supported by the chassis 22, electrically powers all components of the agricultural combine 20 which require electrical power.

A header 30 is mounted at the front of the agricultural combine 20 to cut and gather crop material from a field in order to harvest an agricultural crop. The header 30 is supported by a feederhouse 32, which is pivotally mounted to the chassis 22 thereby coupling the header 30 to the chassis 22. Headers 30*a* and 30*b* are detached from the agricultural combine 20, but may be interchangeably coupled to the agricultural combine 20 in place of header 30. Headers 30, 30*a*, and 30*b* may comprise different types of headers to achieve different harvesting functions. For instance, header 30 may comprise a draper, header 30*a* may comprise a belt pick-up, and header 30*b* may comprise a cornhead. In other embodiments, varying headers may be interchangeably mounted to the agricultural combine 20 in place of header 30.

The feederhouse 32 may include, for example, an inclined conveyor (not shown) for transport of cut crop material from the header 30 into the body of the agricultural combine 20. After passing over a guide drum or feed accelerator 34, the crop material from the feederhouse 32 reaches a generally fore-aft oriented threshing device or separator 36. Other embodiments may include laterally oriented or other threshing devices (not shown). In the embodiment depicted, the separator 36 includes a rotor 38, on which various threshing elements are mounted. The rotor 38 rotates above one or more grated or sieved threshing baskets or concaves 40, such that crop material passing between the rotor 38 and the concave 40 is separated, at least in part, into grain and chaff (or other "material other than grain" (MOG)). The MOG is carried rearward and released from between the rotor 38 and the concave 40. Most of the grain (and some of the MOG) separated in the separator 36 falls downward through apertures in the concave 40.

Grain and MOG passing through the concaves 40 fall (or are actively fed) into a cleaning subsystem (or cleaning shoe) 42 for further cleaning. The cleaning subsystem 42 includes a fan 44, driven by a motor 46, that generates generally rearward air flow, as well as a sieve 48 and a chaffer 50. The sieve 48 and the chaffer 50 are suspended with respect to the chassis 22 by an actuation arrangement 52, which may include pivot arms and rocker arms mounted to disks (or other devices). As the fan 44 blows air across and through the sieve 48 and the chaffer 50, the actuation arrangement 52 may cause reciprocating motion of the sieve 48 and the chaffer 50 (e.g., via movement of the rocker arms). The combination of this motion of the sieve 48 and the chaffer 50 with the air flow from the fan 44 generally causes the lighter chaff to be blown upward and rearward within the agricultural combine 20, while the heavier grain falls through the sieve 48 and the chaffer 50 and accumulates in a clean grain trough 54 near the base of the agricultural combine 20. A clean grain auger 56 disposed in the clean grain trough 54 carries the material to the one side of the agricultural combine 20 and deposits the grain in the lower end of a clean grain elevator 58. The clean grain lifted by the clean grain elevator 58 is carried upward until it reaches the upper exit of the clean grain elevator 58. The clean grain is then released from the clean grain elevator 58 and falls into a grain tank 60.

Most of the grain entering the cleaning subsystem 42, however, is not carried rearward, but passes downward through the chaffer 50, then through the sieve 48. Of the material carried by air from the fan 44 to the rear of the sieve 48 and the chaffer 50, smaller MOG particles are blown out of the rear of the agricultural combine 20. Larger MOG particles and grain are not blown off the rear of the agricultural combine 20, but rather fall off the cleaning subsystem 42 and onto a shoe loss sensor 62 located to one side of the cleaning subsystem 42, which is configured to detect shoe losses on that side of the cleaning subsystem 42, and on a shoe loss sensor 64 located on the another side of the cleaning subsystem 42, which is configured to detect shoe losses on the its side of the cleaning subsystem 42.

Heavier material that is carried to the rear of the chaffer 50 falls out of the agricultural combine 20 and can be partially detected by the cleaning shoe loss sensors 62, 64. Heavier material that is carried to the rear of the sieve 48 falls onto a pan and is then conveyed by gravity downward into a grain tailings trough 66. This heavier material is called "tailings" and is typically a mixture of grain and MOG. A tailings auger 68 is disposed in the tailings trough 66 and carries the grain tailings to the opposite side of the agricultural combine 20 and into a grain tailings elevator 70.

The tailings elevator 70 may be constructed in a similar or different manner as the clean grain elevator 58 using any of various known transport mechanisms (e.g., augers, flighted belts, and so on). The grain tailings elevator 70 communicates with the tailings auger 68 at an infeed or inlet opening 71 of the grain tailings elevator 70 where grain tailings are received for transport for further processing. Grain received into the tailings elevator 70 from the tailings auger 68 through the inlet opening 71 is moved by a conveyor (hidden) of the tailings elevator 70 to an outlet opening 84 where the grain exits the tailings elevator 70 for return to the thresher.

In a passive tailings implementation, the grain tailings elevator 70 carries the grain tailings upward and deposits them on a forward end of the rotor 38 to be re-threshed and separated. The grain tailings are then received by a discharge beater 92 where the remaining kernels of grain are released. The now-separated MOG is released behind the agricultural combine 20 to fall upon the ground in a windrow or are delivered to a residue subsystem 94 that can include a chopper 96 and a spreader 98 where it can be chopped by the chopper 96 and spread on the field by the spreader 98. Alternatively, in an active tailings implementation, the grain tailings elevator 70 may deliver the grain tailings upward to an additional threshing unit (not shown) that is separate from the separator 36 and where the grain tailings are further threshed before being delivered to the main crop flow at the front of the cleaning subsystem 42.

The operator cab 26 includes a user interface system 100 with a set of user interface mechanisms, which the operator can use to control and manipulate the agricultural combine 20. Such interface mechanisms include one or more display devices, audio devices for providing audio information, haptic devices that provide haptic feedback, levers, joysticks, steering wheels, pedals, buttons, etc. User interface mechanisms can also be a set of input mechanisms displayed on a user interface display. For instance, they can be links, icons, or other user actuatable mechanisms.

The user interface system 100 can also include various input and output functionality for interfacing (i.e., controlling or receiving feedback from) various machine components via various sensors and actuators through control system 102. The control system 102 comprises at least one controller 103 which includes one or more processors 105 and memory devices 107 electrically coupled to the electrical power source 29. It will also be appreciated that the agricultural combine 20 can include other sensor and actuator devices in addition to the cleaning show loss sensors 62, 64 and actuation arrangement 52 in the cleaning subsystem 42, and the motor 46 of the fan 44. For instance, the agricultural combine 20 may comprise various actuators and sensors located in each of a header zone (where crop is cut and gathered) 104, a feederhouse zone (which transports cut crop material form the header zone to a separator zone) 106, a separator zone (which separates crop material into grain and chaff) 108, a body zone (which moves grain into the clear grain elevator 58 to be carried to a grain tank zone 112 and to the grain trailings elevator 70 to be carried to the separator zone 108) 110, a grain tank zone (which collects the grain carried by the clear grain elevator) 112, and an engine deck zone (which contains the internal combustion engine 28 which powers the agricultural combine 20) 114. It is noted that the agricultural combine 20 further comprises a cab zone (which contains the operator cab 26 from which the operator controls the agricultural combine 20 using the user interface system 110) 116, and a residue zone (which contains the residue subsystem 94 which spreads residue onto the field) 118.

Figure 2:
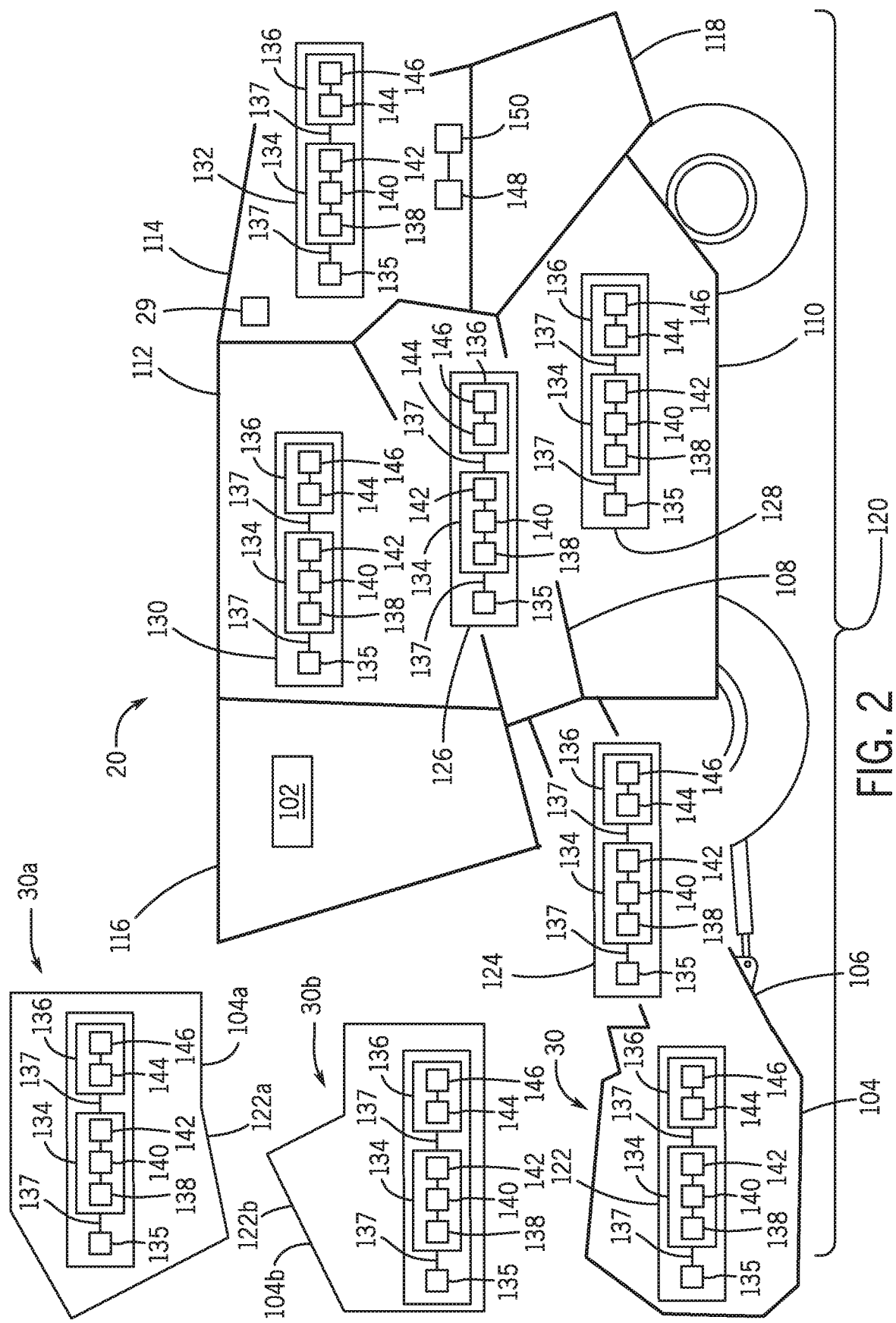
FIG. 2 is a schematic view illustrating one embodiment of a distributed electrohydraulic system which may be used in the agricultural combine of FIG. 1.

FIG. 2 is a schematic view illustrating one embodiment of a distributed electrohydraulic system 120 which may be used in the agricultural combine 20 of FIG. 1. The distributed electrohydraulic system 120 comprises: electrohydraulic module 122 in the header zone 104 of header 30; electrohydraulic module 124 in the feederhouse zone 106, electrohydraulic module 126 in the separator zone 108; electrohydraulic module 128 in the body zone 110; electrohydraulic module 130 in the grain tank zone 112; and electrohydraulic module 132 in the engine deck zone 114. Each of the plurality of electrohydraulic modules 122, 124, 126, 128, 130, and 132 comprises one or more hydraulic components 134 and one or more electrically-operated components 136 configured to affect an operation of the one or more hydraulic components 134. Each of the plurality of electrohydraulic modules 122, 124, 126, 128, 130, and 132 may further include a sensor 135 to sense at least one of a pressure of hydraulic fluid and a position of at least one of the one or more hydraulic components 134 in the plurality of electrohydraulic modules 122, 124, 126, 128, 130, and 132. The one or more hydraulic components 134 of each of the plurality of electrohydraulic modules 122, 124, 126, 128, 130, and 132 are hydraulically isolated from the one or more hydraulic components 134 of another of the plurality of electrohydraulic modules 122, 124, 126, 128, 130, and 132. At least one of the plurality of electrohydraulic modules 122, 124, 126, 128, 130, and 132 includes at least one hydraulic line 137 to facilitate flow of hydraulic fluid within at least one of the plurality of electrohydraulic modules 122, 124, 126, 128, 130, and 132. The at least one hydraulic line 137 is solely positioned in the respective electrohydraulic module and does not extend into any other of the electrohydraulic modules. The one or more electrically-operated components 136 of each of the plurality of electrohydraulic modules 122, 124, 126, 128, 130, and 132 is electrically coupled to the electrical power source 29 to receive electrical power. The control system 102 is electrically coupled to the one or more electrically-operated components 136 of the plurality of electrohydraulic modules 122, 124, 126, 128, 130, and 132. The control system 102 is configured to execute control commands to operate independently the one or more electrically-operated components 136 of each of the plurality of electrohydraulic modules 122, 124, 126, 128, 130, and 132.

The one or more hydraulic components 134 of each of the plurality of electrohydraulic modules 122, 124, 126, 128, 130, and 132 include: a hydraulic reservoir 138 for containing hydraulic fluid; a hydraulic pump 140 in communication with the hydraulic reservoir 138; and a hydraulic actuator 142 coupled to the hydraulic pump 140, the hydraulic actuator 142 being moveable by the hydraulic pump 140 between a first position and a second position. The one or more electrically-operated components 136 of each of the plurality of electrohydraulic modules 122, 124, 126, 128, 130, and 132 include: a valve 144 in communication with the control system 102, the electrical power source 29, and the hydraulic reservoir 138 to selectively allow and prevent flow of hydraulic fluid from and to the hydraulic reservoir 138; and a motor 146 in communication with the control system 102, the electrical power source 29, and the hydraulic pump 140 to affect operation of the hydraulic pump 140.

The agricultural combine 20 may further include a main hydraulic reservoir 148 for containing hydraulic fluid, and a main hydraulic pump 150 in communication with the main hydraulic reservoir 148. The main hydraulic pump 150 may be in communication with at least one hydraulic component 134 of the plurality of electrohydraulic modules 122, 124, 126, 128, 130, and 132 to affect operation of the at least one hydraulic component 134. The at least one hydraulic component 134, the main hydraulic reservoir 148, and the main hydraulic pump 150 may be hydraulically isolated from the remaining hydraulic components 134 of the plurality of electrohydraulic modules 122, 124, 126, 128, 130, and 132. A main pressure provided by the main hydraulic pump 150 may be greater than module pressures of the hydraulic pumps 140 of the plurality of electrohydraulic modules 122, 124, 126, 128, 130, and 132.

For instance, the main hydraulic pump 150 may be in communication with hydraulic component 134 of electrohydraulic module 122 to affect operation of hydraulic component 134. Hydraulic component 134 of electrohydraulic module 122, the main hydraulic reservoir 148, and the main hydraulic pump 150 may be hydraulically isolated from the remaining hydraulic components 134 of electroyhydraulic modules 124, 126, 128, 130, and 132. A main pressure provided by the main hydraulic pump 150 may be greater than module pressures of the hydraulic pumps 140 of the plurality of electrohydraulic modules 122, 124, 126, 128, 130, and 132.

Detached headers 30a and 30b, which may be interchangeably mated in place of header 30 to the agricultural combine 20 in order to interchangeably electrically couple them to the electrical power source 29, each have respective electrohydraulic modules comprising header modules 122a and 122b in their header zones 104a and 104b which may be electrically coupled to and controlled by the control system 102. Header modules 122a and 122b each comprise one or more hydraulic components 134 including a hydraulic reservoir 138, a hydraulic pump 140, and a hydraulic actuator 142. Header modules 122a and 122b each further comprise one or more electrically-operated components 136 including a valve 144 and a motor 146. The one or more hydraulic components 134 and the one or more electrically-operated components 136 of the header modules 122a and 122b are supported on respective headers 30a and 30b. Each of the header modules 122a and 122b may further include a sensor 135 to sense at least one of a pressure of hydraulic fluid and a position of at least one of the one or more hydraulic components 134 in the header modules 122a and 122b. At least one of the header modules 122a and 122b may include at least one hydraulic line 137 to facilitate flow of hydraulic fluid within at least one of the header modules 122a and 122b. The at least one hydraulic line 137 may be solely positioned in the respective header module 122a and 122b and may not extend into any other of the electrohydraulic modules.

Figure 3:
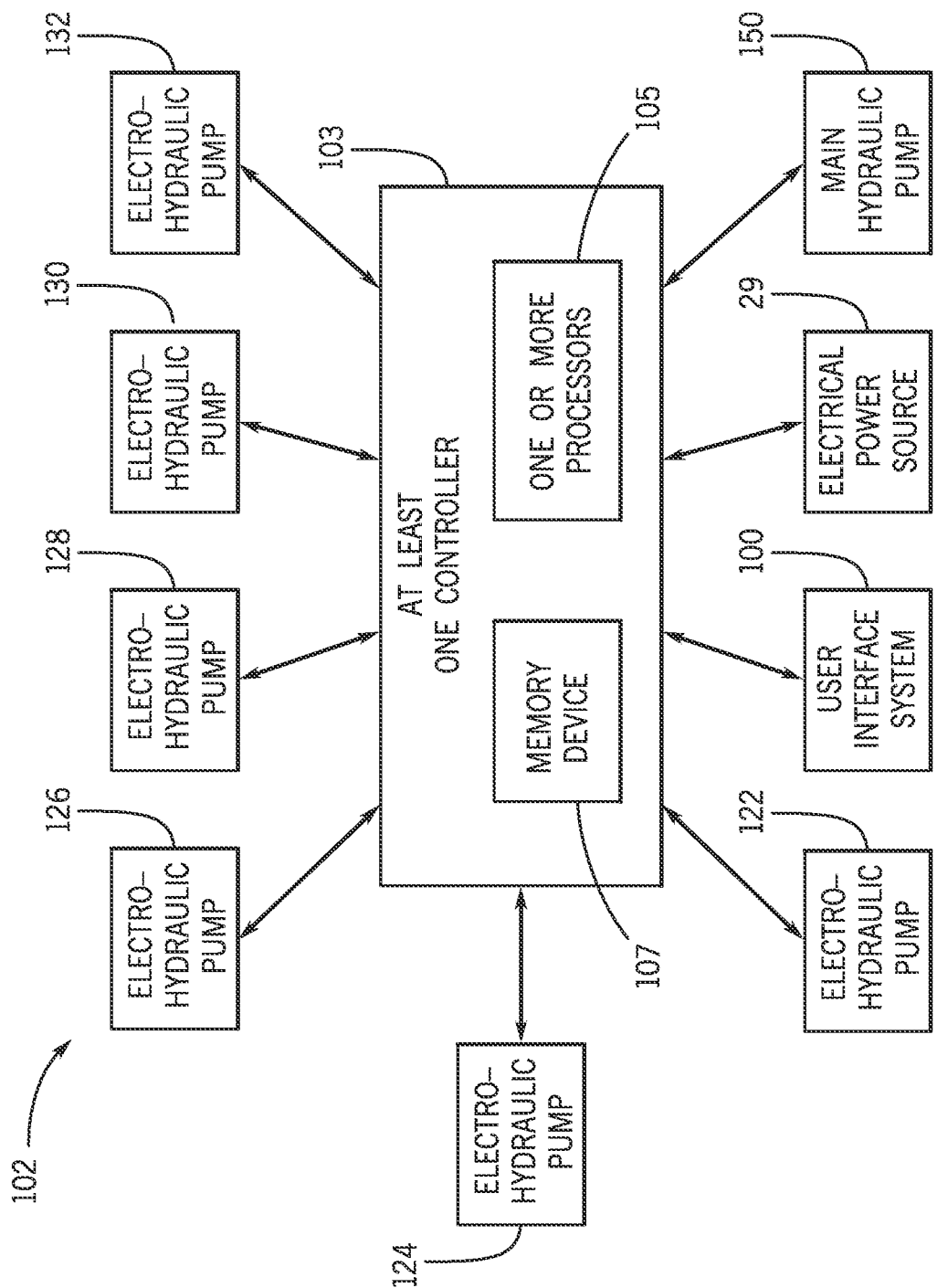
FIG. 3 is a schematic diagram of one embodiment of a control system which may be used in the agricultural combine of FIGS. 1 and 2.

FIG. 3 is a schematic diagram illustrating one embodiment of the control system 102 of the agricultural combine 20 of FIGS. 1 and 2. The control system 102 comprises the at least one controller 103, which includes the one or more processors 105 and memory devices 107, in two-way communication with the following components of the distributed electrohydraulic system 120: user interface system 100; the electrical powersource 29; electrohydraulic modules 122, 124, 126, 128, 130, and 132; and main hydraulic pump 150. The at least one controller 103 may receive input signals from each of the user interface system 100, the electrical powersource 29, electrohydraulic modules 122, 124, 126, 128, 130, and 132, and main hydraulic pump 150. The at least one controller 103 may process the received input signals and, based on the processing, output control signals to each of the user interface system 100, the electrical powersource 29, electrohydraulic modules 122, 124, 126, 128, 130, and 132, and main hydraulic pump 150 in order to control each of these components. In other embodiments, one or more components of the control system 102 may vary.

FIGS. 4-11 illustrate various embodiments of the electrohydraulic modules 122, 124, 126, 128, 130, and 132 of FIGS. 1 and 2. For drawing simplicity, each assembly 152*a-q* in the electrohydraulic modules 122, 124, 126, 128, 130, and 132 of FIGS. 4-11 represents a combination of each of the following hydraulic components 134 as shown and discussed in FIGS. 1-2: hydraulic reservoir 138 and hydraulic pump 140; and further represents each of the following electrically-operated components 136 as shown and discussed in FIGS. 1-2: valve 144 and motor 146. Additionally, in FIGS. 4-11 different types of actuators 142*a-y* are provided. Each of these different actuators 142*a-y* represents a particular type of hydraulic actuator 142 as shown and discussed in FIGS. 1-2. Moreover, in FIGS. 4-11 hydraulic lines 137 represent the same hydraulic lines 137 as shown and discussed in FIGS. 1-2.

Figure 4:
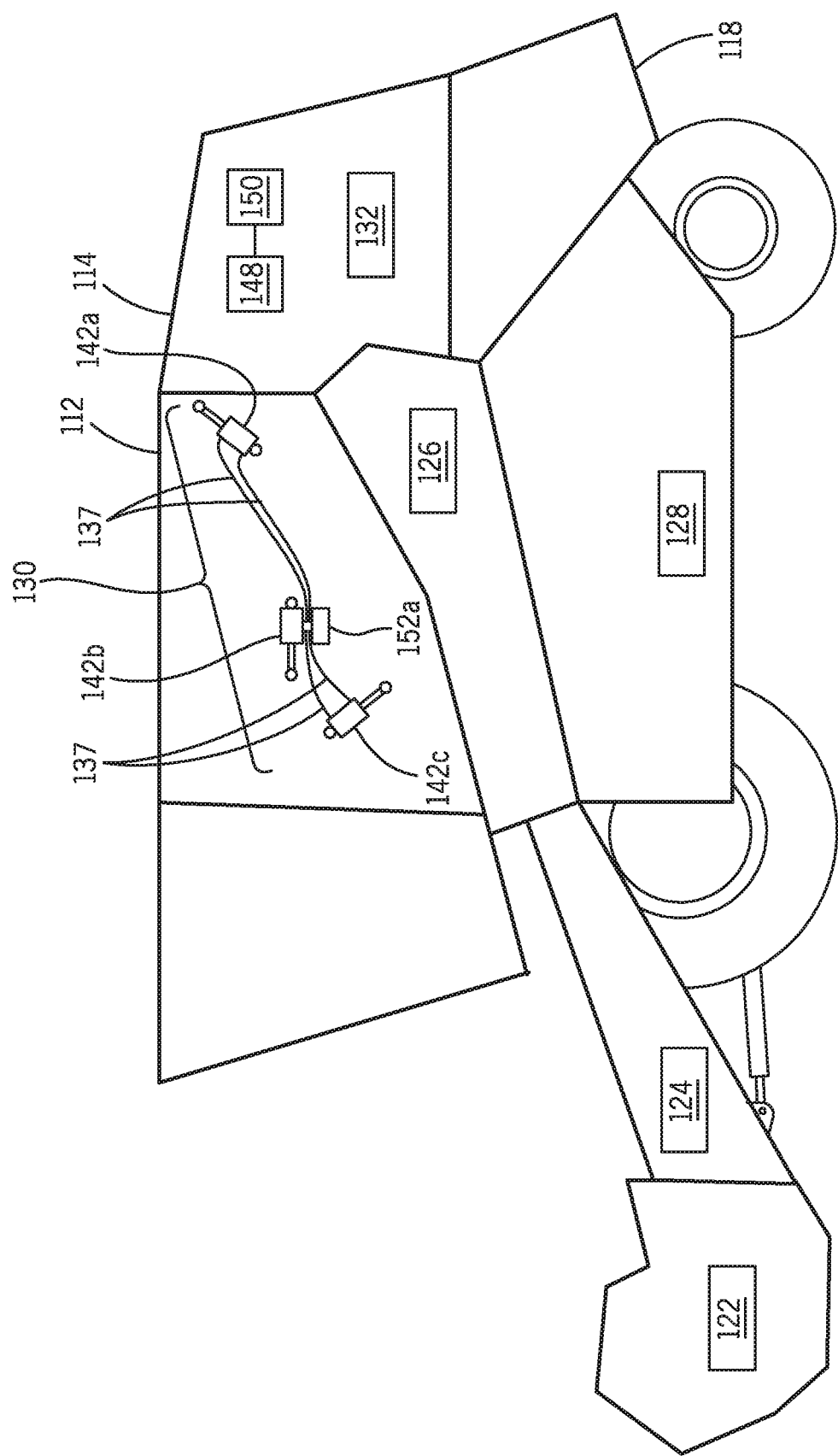
FIG. 4 is a schematic view of one embodiment of an electrohydraulic module which may be used for a grain tank zone of the example agricultural combine of FIGS. 1 and 2.

FIG. 4 illustrates a schematic view of one embodiment of electrohydraulic module 130 in the grain tank zone 112 of FIGS. 1 and 2. Electrohydraulic module 130 comprises the following hydraulic actuators 142*a-c*: powered grain tank cover actuators 142*a* which open and close grain tank covers in the grain tank zone 112; auger swing actuator 142*b* which swings an auger tube of the grain tank zone 112 in and out; and cross auger belt tensioner actuator 142*c* which tensions a cross auger drive belt of the grain tank zone 112. Assembly 152*a* is directly hydraulically connected to auger swing actuator 142*b*, and solely hydraulically powers auger swing actuator 142*b* without hydraulic assistance from the other electrohydraulic modules 122, 124, 126, 128, and 132 of FIGS. 1-2 or from the main hydraulic reservoir 148 or main hydraulic pump 150 in the engine deck zone 114 as shown and discussed in FIGS. 1-2. Assembly 152*a* is hydraulically connected to cross-auger belt tensioner 142*c* and powered grain tank actuators 142*a* through hydraulic lines 137, and solely hydraulically powers auger swing actuator 142*b* without hydraulic assistance from the other electrohydraulic modules 122, 124, 126, 128, and 132 of FIGS. 1-2 or from the main hydraulic reservoir 148 or main hydraulic pump 150 in the engine deck zone 114 as shown and discussed in FIGS. 1-2. The hydraulic lines 137 in electrohydraulic module 130 are positioned solely in electrohydraulic module 130 and do not extend into any of the other electrohydraulic modules 122, 124, 126, 128, and 132 of FIGS. 1-2.

Figure 5:
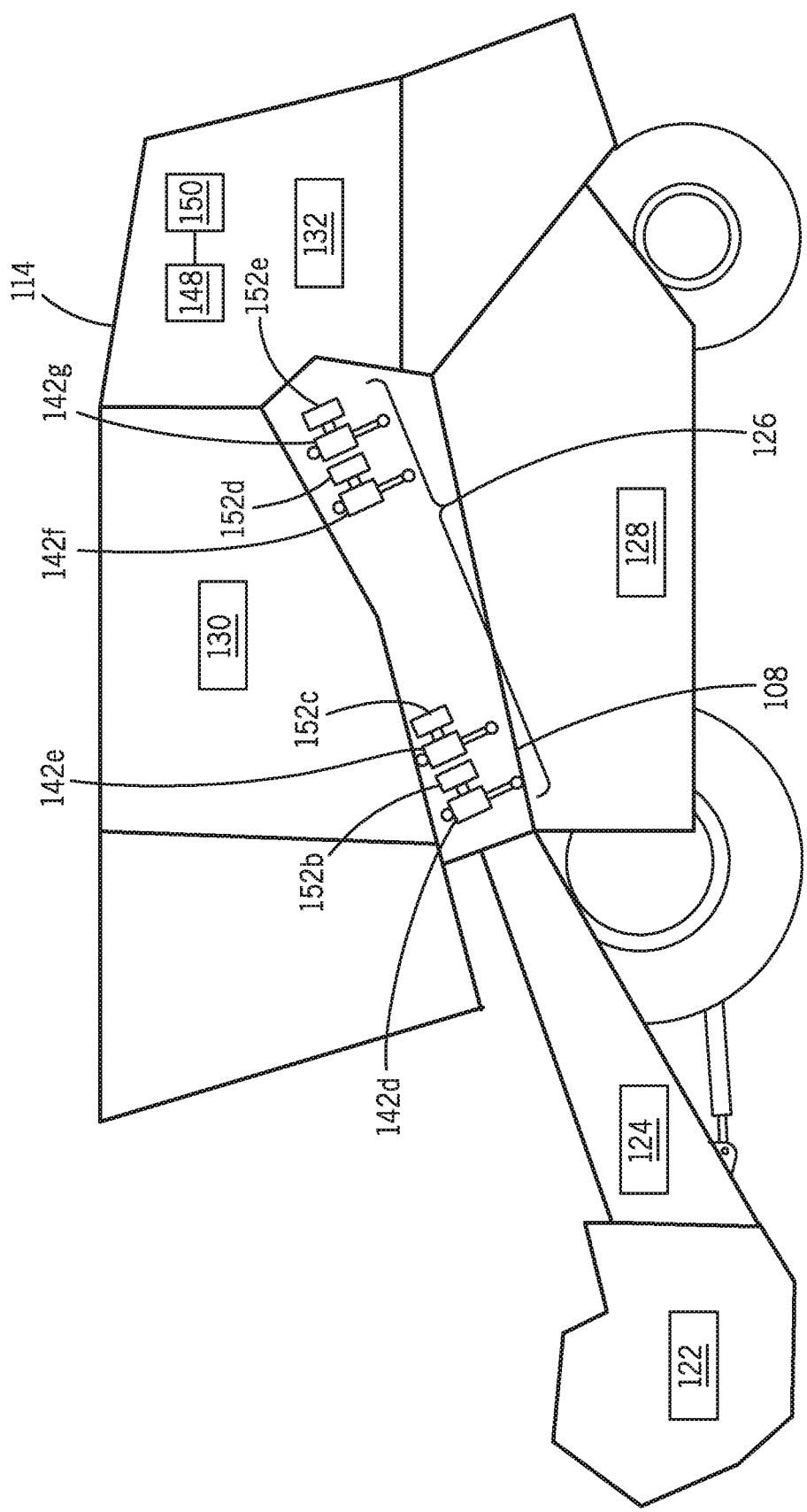
FIG. 5 is a schematic view of one embodiment of an electrohydraulic module which may be used for a separator zone of the example agricultural combine of FIGS. 1 and 2.

FIG. 5 illustrates a schematic view of one embodiment of electrohydraulic module 126 in the separator zone 108 of FIGS. 1 and 2. Electrohydraulic module 126 comprises the following hydraulic actuators 142*d-g*: active concave isolation actuators 142*d*, 142*e*, 142*f*, and 142*g* which control the position of threshing concaves. Assemblies 152*b*, 152*c*, 152*d*, and 152*e* are each separately directly hydraulically connected to one of respective active concave isolation actuators 142*d*, 142*e*, 142*f*, and 142*g* without hydraulic assistance from the other electrohydraulic modules 122, 124, 126, 128, and 132 of FIGS. 1-2 or from the main hydraulic reservoir 148 or main hydraulic pump 150 in the engine deck zone 114 as shown and discussed in FIGS. 1-2. No hydraulic lines extend through electrohydraulic module 126.

Figure 6:
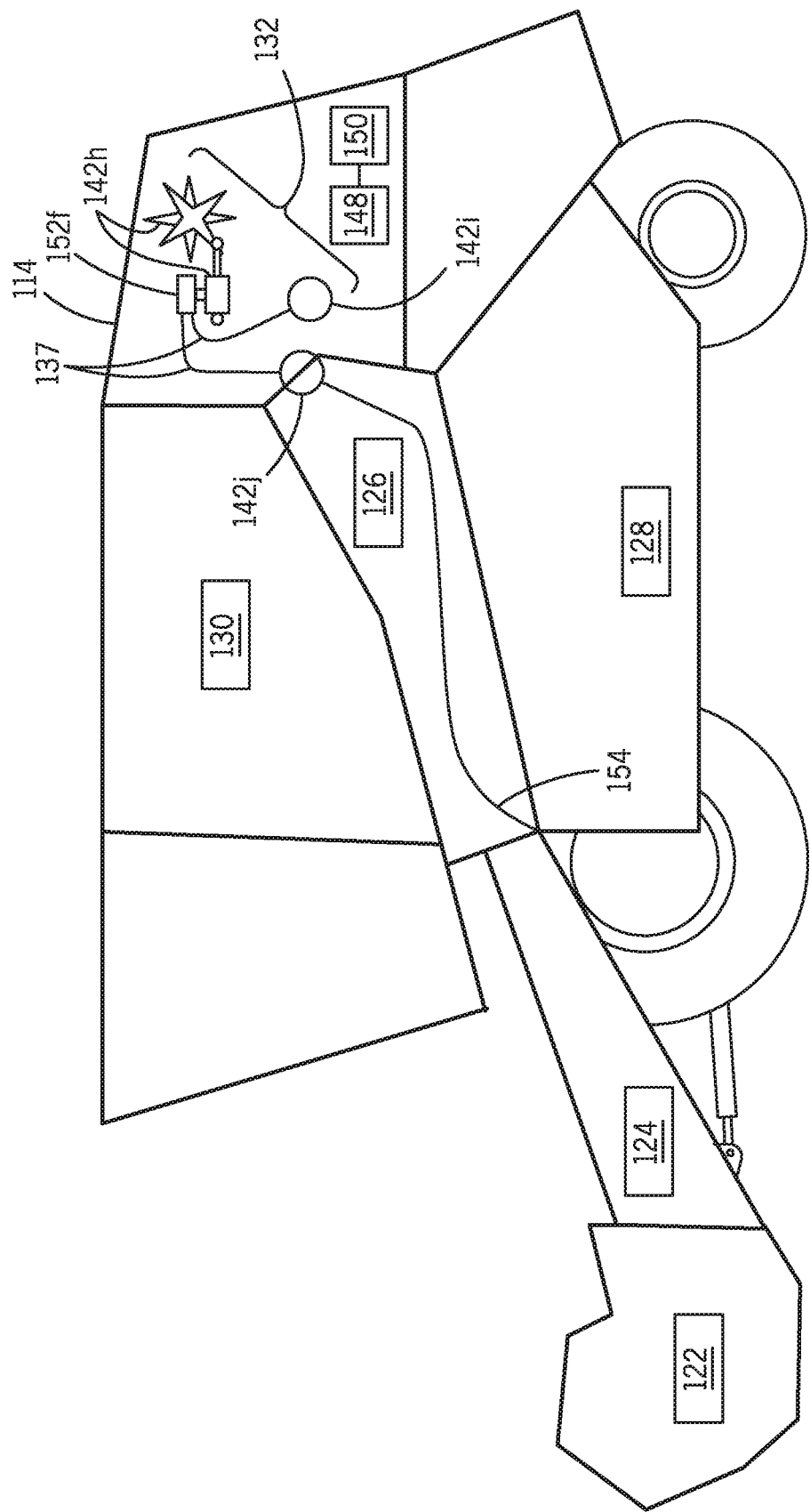
FIG. 6 is a schematic view of one embodiment of an electrohydraulic module which may be used for an engine deck zone of the example agricultural combine of FIGS. 1 and 2.

FIG. 6 illustrates a schematic view of one embodiment of electrohydraulic module 132 in the engine deck zone 114 of FIGS. 1 and 2. Electrohydraulic module 132 comprises the following hydraulic actuators 142*h-j*: variable pitch fan actuator 142*h* which controls the pitch of blades of a cooling fan in the engine deck zone 114; variable speed rotor actuator 142*i* which controls sheave spacing to change drive speed of a rotor in the engine deck zone 114; and variable speed front end drive actuator 142*j* which controls sheave spacing to change front end drive speed. Assembly 152*f* is directly hydraulically connected to variable pitch fan actuator 142*h* and solely hydraulically powers variable pitch fan actuator 142*h* without hydraulic assistance from the other electrohydraulic modules 122, 124, 126, 128, and 130 of FIGS. 1-2 or from the main hydraulic reservoir 148 or main hydraulic pump 150 in the engine deck zone 114 as shown and discussed in FIGS. 1-2. Assembly 152*f* is hydraulically connected to variable speed rotor actuator 142*i* and variable speed front end drive actuator 142*j* through hydraulic lines 137, and solely hydraulically powers variable speed rotor actuator 142*i* and variable speed front end drive actuator 142*j* without hydraulic assistance from the other electrohydraulic modules 122, 124, 126, 128, and 130 of FIGS. 1-2 or from the main hydraulic reservoir 148 or main hydraulic pump 150 in the engine deck zone 114 as shown and discussed in FIGS. 1-2. The hydraulic lines 137 in electrohydraulic module 132 are positioned solely in electrohydraulic module 132 and do not extend into any of the other electrohydraulic modules 122, 124, 126, 128, and 130 of FIGS. 1-2. Line 154 is a drain line to drain hydraulic fluid.

Figure 7:
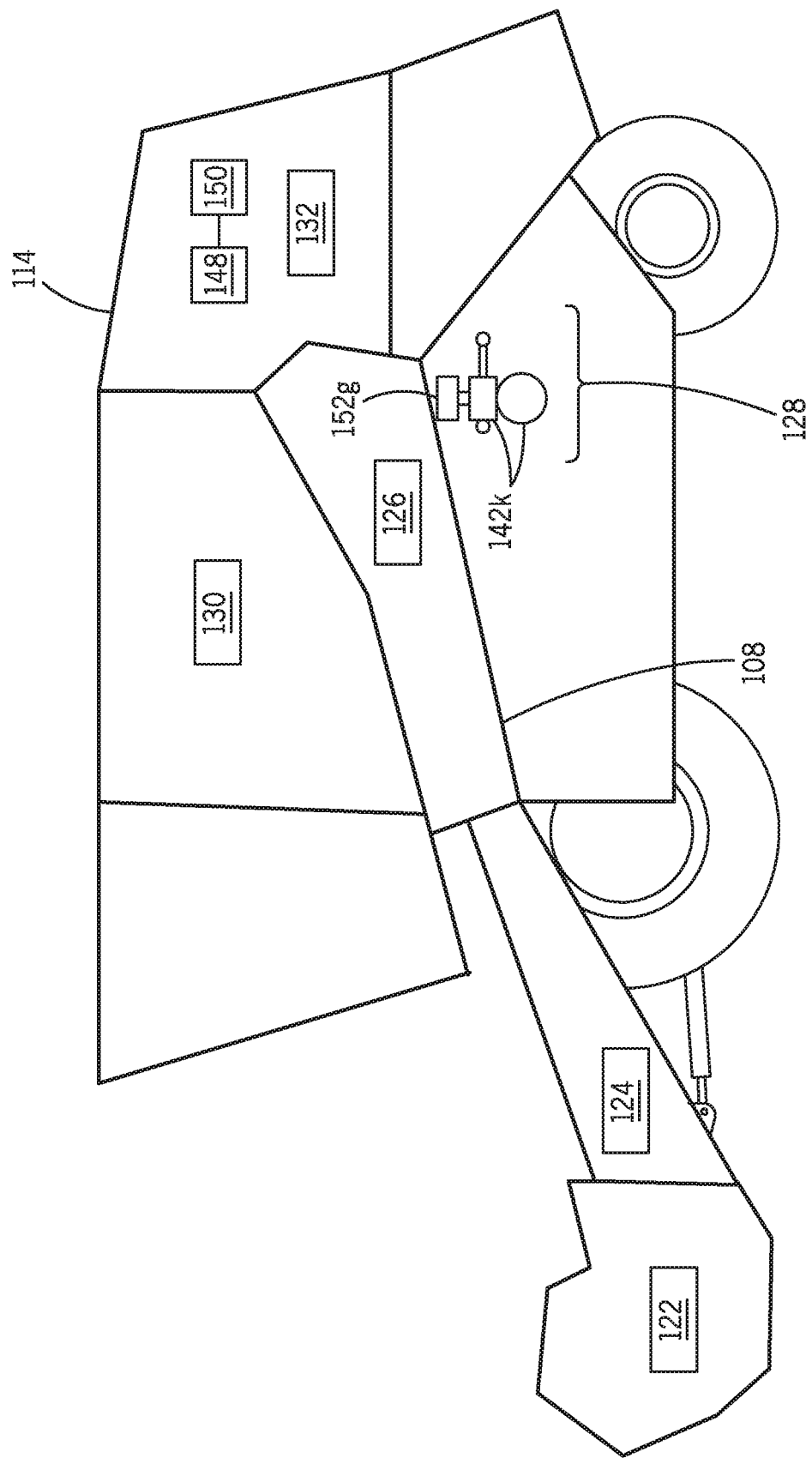
FIG. 7 is a schematic view of one embodiment of an electrohydraulic module which may be used for a body zone of the example agricultural combine of FIGS. 1 and 2.

FIG. 7 illustrates a schematic view of one embodiment of electrohydraulic module 128 in the body zone 110 of FIGS. 1 and 2. Electrohydraulic module 128 comprises the following hydraulic actuator 142*k*: variable speed cleaning fan actuator 142*k* which changes the speed of a separator cleaning fan sheave in the body zone 110. Assembly 152*g* is directly hydraulically connected to variable speed cleaning fan actuator 142*k*, and solely hydraulically powers variable speed cleaning fan actuator 142*k* without hydraulic assistance from the other electrohydraulic modules 122, 124, 126, 130, and 132 of FIGS. 1-2 or from the main hydraulic reservoir 148 or main hydraulic pump 150 in the engine deck zone 114 as shown and discussed in FIGS. 1-2. No hydraulic lines extend through electrohydraulic module 128.

Figure 8:
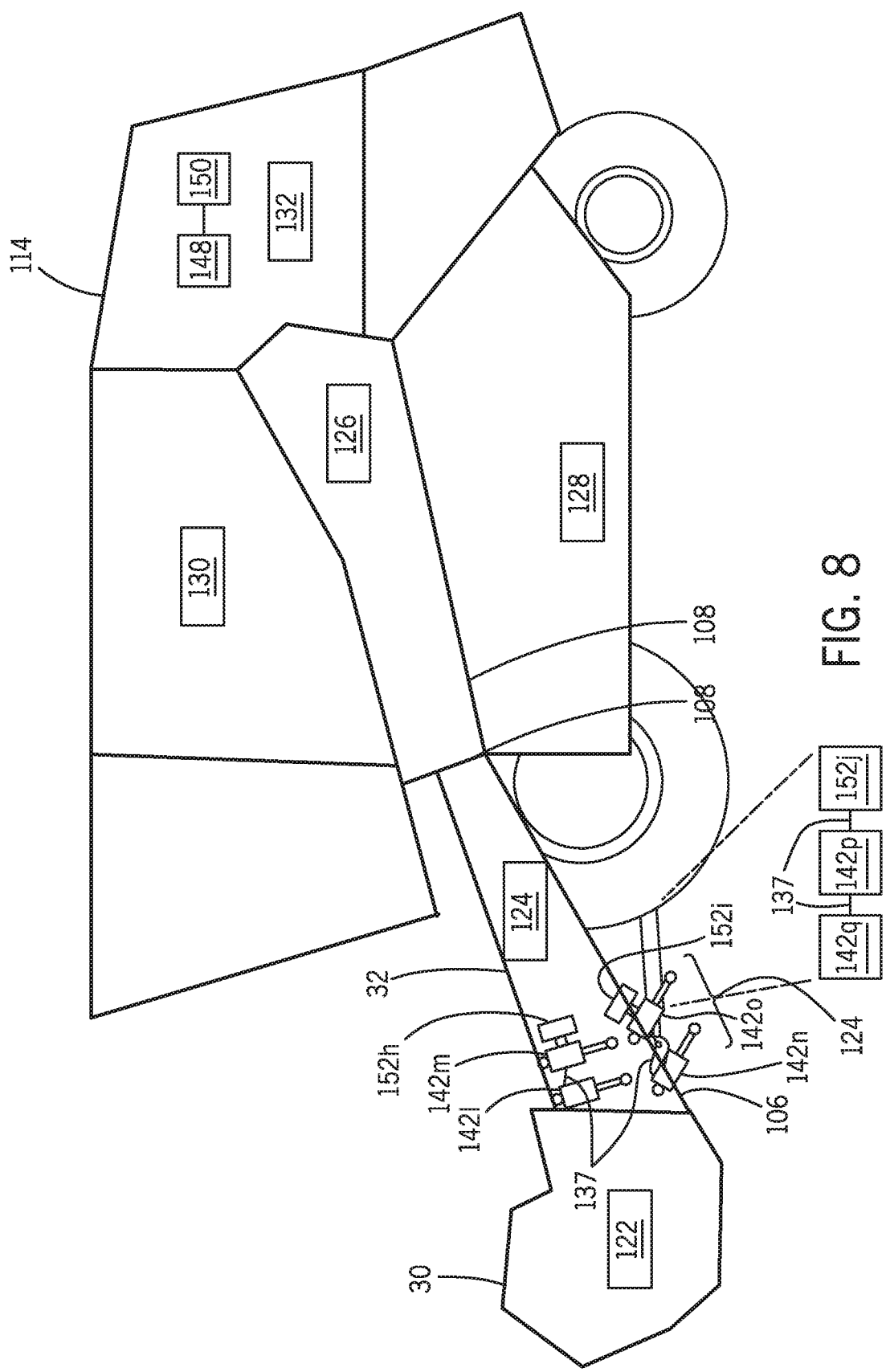
FIG. 8 is a schematic view of one embodiment of an electrohydraulic module which may be used for a feederhouse zone of the example agricultural combine of FIGS. 1 and 2.

FIG. 8 illustrates a schematic view of one embodiment of electrohydraulic module 124 in the feederhouse zone 106 of FIGS. 1 and 2. Electrohydraulic module 124 comprises the following hydraulic actuators 142*l-q*: lateral tilt actuators 142*l* and 142*m* which tilt the header 30 to the left and right; fore/aft tilt actuators 142*n* and 142*o* which tilt the header 30 forward and backward; and feederhouse raise/lower actuators 142*p* and 142*q* which raise and lower the feederhouse 32. Assembly 152*h* is directly hydraulically connected to lateral tilt actuator 142*l* and is hydraulically connected to lateral tilt actuator 142*m* through hydraulic line 137, and solely hydraulically powers lateral tilt actuators 142*l* and 142*m* without hydraulic assistance from the other electrohydraulic modules 122, 126, 128, 130, and 132 of FIGS. 1-2 or from the main hydraulic reservoir 148 or main hydraulic pump 150 in the engine deck zone 114 as shown and discussed in FIGS. 1-2. Assembly 152*i* is directly hydraulically connected to fore/aft tilt actuator 142*n* and is hydraulically connected to fore/aft tilt actuator 142*o* through hydraulic line 137, and solely hydraulically powers fore/aft tilt actuators 142*n* and 142*o* without hydraulic assistance from the other electrohydraulic modules 122, 126, 128, 130, and 132 of FIGS. 1-2 or from the main hydraulic reservoir 148 or main hydraulic pump 150 in the engine deck zone 114 as shown and discussed in FIGS. 1-2. Assembly 152*j* is directly hydraulically connected to feederhouse raise/lower actuator 142*p* and is hydraulically connected to feederhouse raise/lower actuator 142*q* through hydraulic line 137, and solely hydraulically powers feederhouse raise/lower actuators 142*p* and 142*q* without hydraulic assistance from the other electrohydraulic modules 122, 126, 128, 130 and 132 of FIGS. 1-2 or from the main hydraulic reservoir 148 or main hydraulic pump 150 in the engine deck zone 114 as shown and discussed in FIGS. 1-2. The hydraulic lines 137 in electrohydraulic module 124 are positioned solely in electrohydraulic module 124 and do not extend into any of the other electrohydraulic modules 122, 126, 128, 130, and 132 of FIGS. 1-2.

Figure 9:
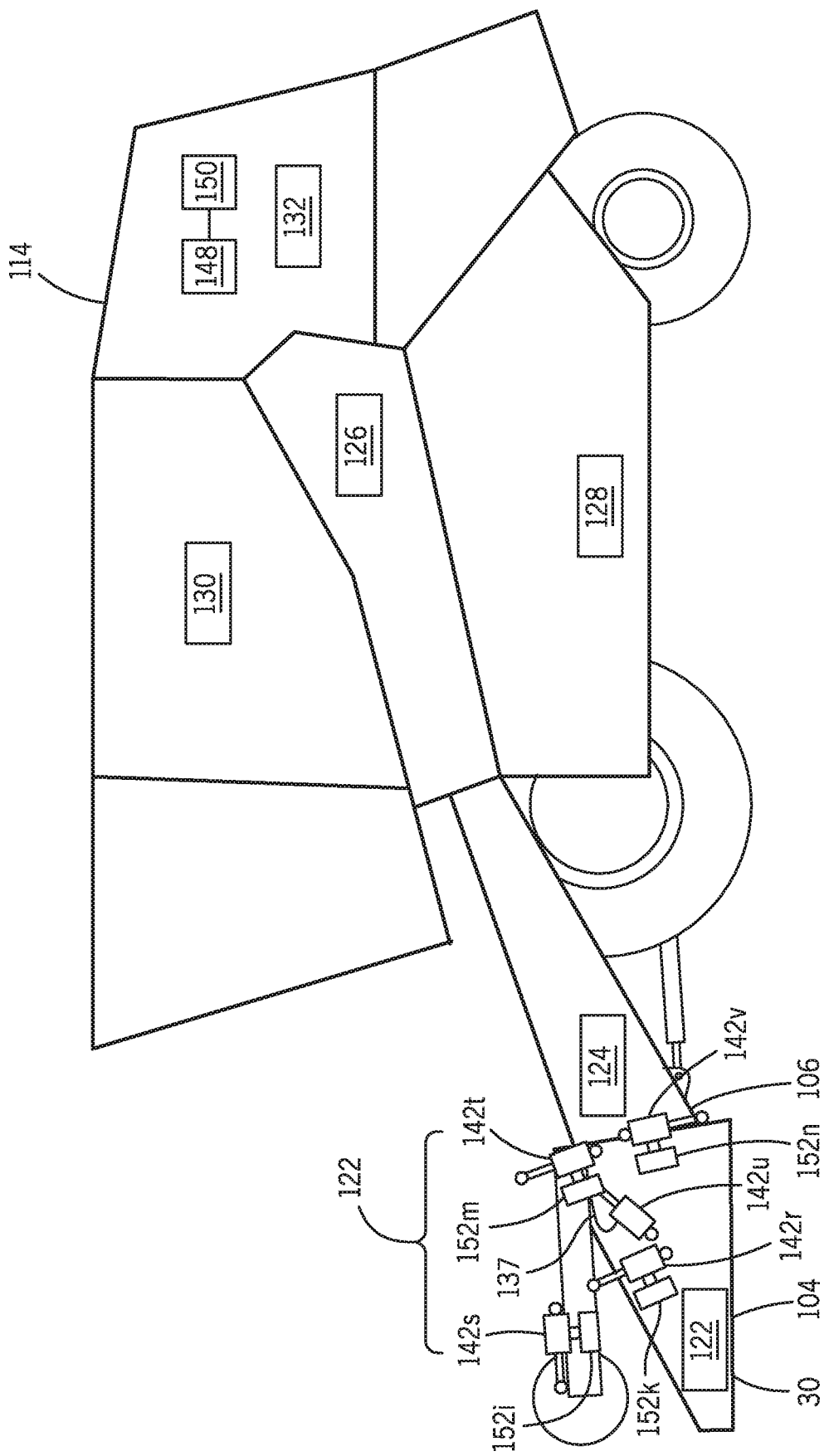
FIG. 9 is a schematic view of one embodiment of an electrohydraulic module which may be used for a header zone of the agricultural combine of FIGS. 1 and 2.

FIG. 9 illustrates a schematic view of one embodiment of electrohydraulic module 122 in the header zone 104 of header 30 of FIGS. 1 and 2. Electrohydraulic module 122 comprises the following hydraulic actuators 142*r-v*: reel lift/lower actuator 142*r* which raises and lowers a reel in the header zone 104; reel fore/aft actuator 142*s* which moves the reel in the header zone 104 forwards and backwards; wing pressure increase/decrease actuator 142*t* which changes a pressure in a wing circuit in the header zone 104; attachment frame pressure increase/decrease actuator 142*u* which changes a pressure in an attachment frame circuit in the header zone 104; and gage wheel raise/lower actuator 142*v* which raises and lowers gage wheels in the header zone 104. Assembly 152*k* is directly hydraulically connected to reel lift/lower actuator 142*r*, and solely hydraulically powers reel lift/lower actuator 142*r* without hydraulic assistance from the other electrohydraulic modules 124, 126, 128, 130, and 132 of FIGS. 1-2 or from the main hydraulic reservoir 148 or main hydraulic pump 150 in the engine deck zone 114 as shown and discussed in FIGS. 1-2. Assembly 152*l* is directly hydraulically connected to reel fore/aft actuator 142*s*, and solely hydraulically powers reel fore/aft actuator 142*s* without hydraulic assistance from the other electrohydraulic modules 124, 126, 128, 130, and 132 of FIGS. 1-2 or from the main hydraulic reservoir 148 or main hydraulic pump 150 in the engine deck zone 114 as shown and discussed in FIGS. 1-2. Assembly 152*m* is directly hydraulically connected to wing pressure increase/decrease actuator 142*t* and is hydraulically connected to attachment frame pressure increase/decrease actuator 142*u* through hydraulic line 137, and solely hydraulically powers wing pressure increase/decrease actuator 142*t* and attachment frame pressure increase/decrease actuator 142*u* without hydraulic assistance from the other electrohydraulic modules 124, 126, 128, 130 and 132 of FIGS. 1-2 or from the main hydraulic reservoir 148 or main hydraulic pump 150 in the engine deck zone 114 as shown and discussed in FIGS. 1-2. Assembly 152*n* is directly hydraulically connected to gage wheel raise/lower actuator 142*v*, and solely hydraulically powers gage wheel raise/lower actuator 142*v* without hydraulic assistance from the other electrohydraulic modules 124, 126, 128, 130, and 132 of FIGS. 1-2 or from the main hydraulic reservoir 148 or main hydraulic pump 150 in the engine deck zone 114 as shown and discussed in FIGS. 1-2. The hydraulic line 137 in electrohydraulic module 122 is positioned solely in electrohydraulic module 122 and does not extend into any of the other electrohydraulic modules 124, 126, 128, 130, and 132 of FIGS. 1-2.

Figure 10:
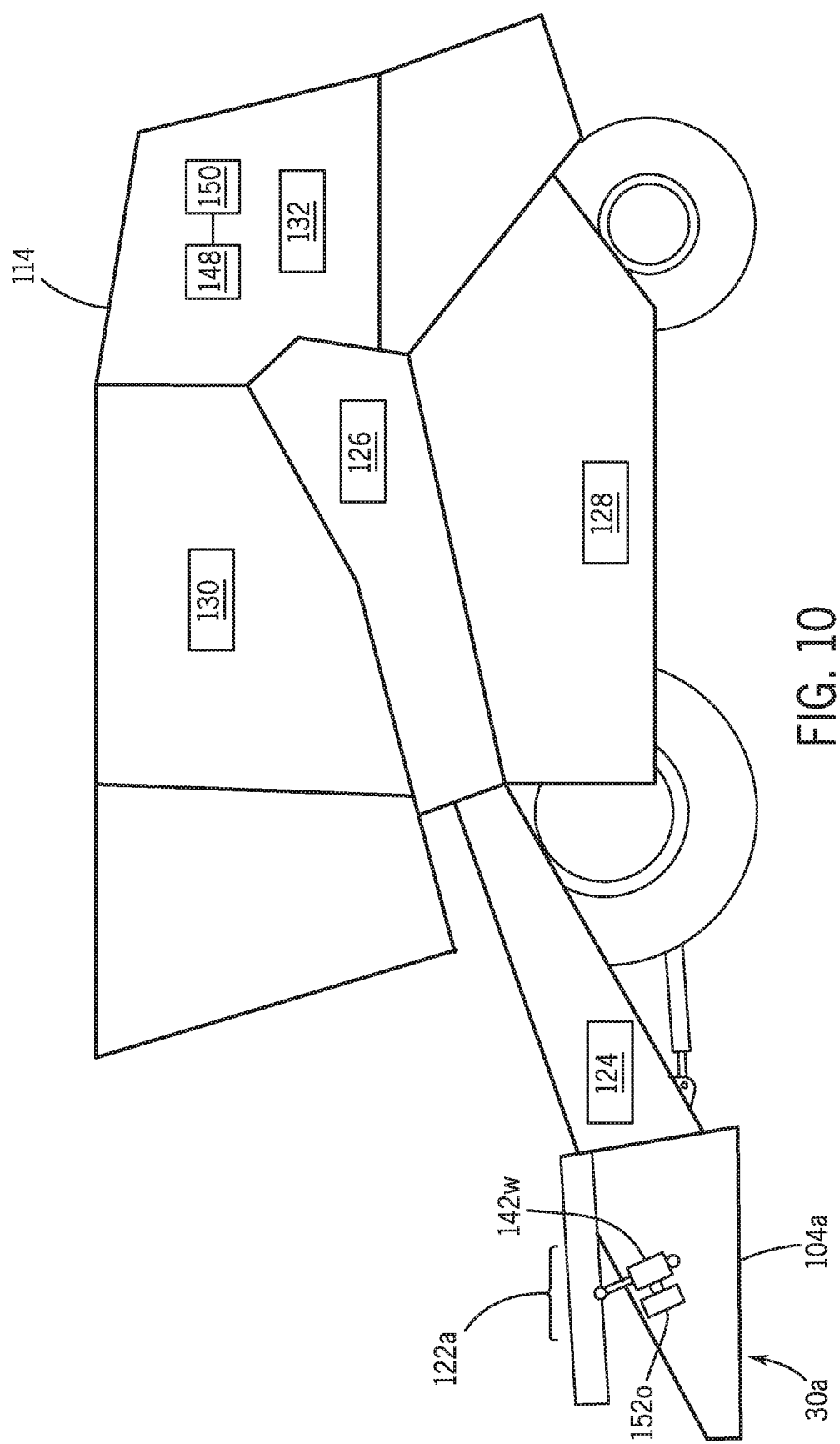
FIG. 10 is a schematic view of another embodiment of an electrohydraulic header module which may be used for the header zone of the agricultural combine of FIGS. 1 and 2.

FIG. 10 illustrates a schematic view of one embodiment of electrohydraulic header module 122*a* in the header zone 104*a* of header 30*a* of FIGS. 1 and 2. Electrohydraulic header module 122*a* comprises the following hydraulic actuator 142*w*: windscreen lift/lower actuator 142*w* which raises and lowers a windscreen in the header zone 104*a*. Assembly 152*o* is directly hydraulically connected to windscreen lift/lower actuator 142*w*, and solely hydraulically powers windscreen lift/lower actuator 142*w* without hydraulic assistance from the other electrohydraulic modules 124, 126, 128, 130, and 132 of FIGS. 1-2 or from the main hydraulic reservoir 148 or main hydraulic pump 150 in the engine deck zone 114 as shown and discussed in FIGS. 1-2.

Figure 11:
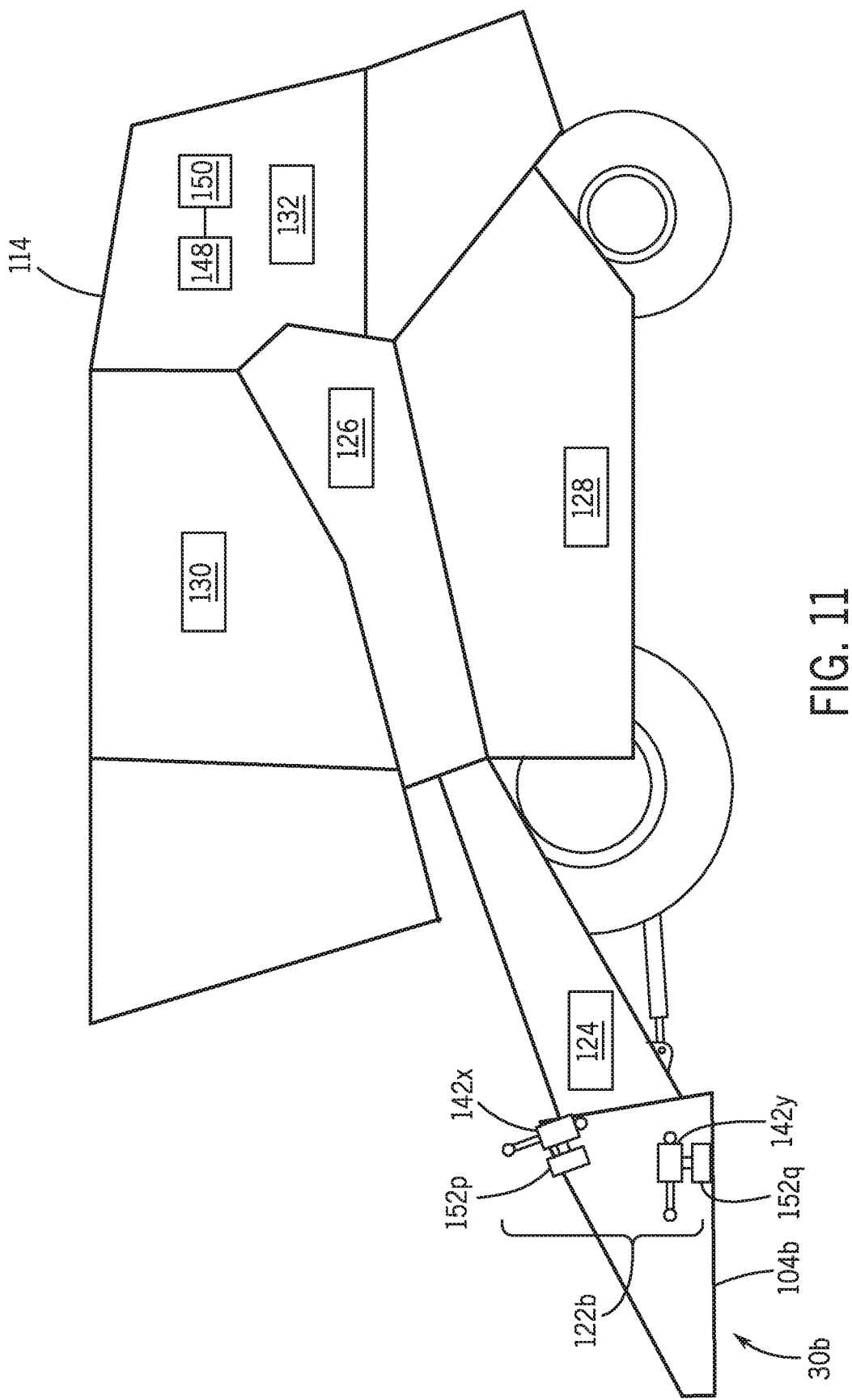
FIG. 11 is a schematic view of still another embodiment of an electrohydraulic header module which may be used for the header zone of the agricultural combine of FIGS. 1 and 2.

FIG. 11 illustrates a schematic view of one embodiment of electrohydraulic header module 122*b* in the header zone 104*b* of header 30*b* of FIGS. 1 and 2. Electrohydraulic header module 122*b* comprises the following hydraulic actuator 142*x-y*: wing fold/unfold actuator 142*x* which folds and unfolds wings in the header zone 104*b*; and deck plate adjust actuator 142*y* which opens and closes deck plates in the header zone 104*b*. Assembly 152*p* is directly hydraulically connected to wing fold/unfold actuator 142*x*, and solely hydraulically powers wing fold/unfold actuator 142*x* without hydraulic assistance from the other electrohydraulic modules 124, 126, 128, 130, and 132 of FIGS. 1-2 or from the main hydraulic reservoir 148 or main hydraulic pump 150 in the engine deck zone 114 as shown and discussed in FIGS. 1-2. Assembly 152*q* is directly hydraulically connected to deck plate adjust actuator 142*y*, and solely hydraulically powers deck plate adjust actuator 142*y* without hydraulic assistance from the other electrohydraulic modules 124, 126, 128, 130, and 132 of FIGS. 1-2 or from the main hydraulic reservoir 148 or main hydraulic pump 150 in the engine deck zone 114 as shown and discussed in FIGS. 1-2.

Also, the following examples are provided, which are numbered for easier reference.

1. A distributed electrohydraulic system for an agricultural combine, the system comprising: an electrical power source; a plurality of electrohydraulic modules each of which includes one or more hydraulic components and one or more electrically-operated components configured to affect an operation of the one or more hydraulic components, the one or more hydraulic components of each of the plurality of electrohydraulic modules being hydraulically isolated from the one or more hydraulic components of another one of the plurality of electrohydraulic modules, and the one or more electrically-operated components of each of the plurality of electrohydraulic modules being electrically coupled to the electrical power source to receive electrical power; and a control system including one or more processors and memory devices electrically coupled to the electrical power source and the one or more electrically-operated components of the plurality of electrohydraulic modules, the control system being configured to execute control commands to operate independently the one or more electrically-operated components of each of the plurality of electrohydraulic modules.

2. The system of example 1, wherein the hydraulic components of each of the plurality of electrohydraulic modules include: a hydraulic reservoir for containing hydraulic fluid; a hydraulic pump in communication with the hydraulic reservoir; and a hydraulic actuator coupled to the hydraulic pump, wherein the hydraulic actuator is moveable by the hydraulic pump between a first position and a second position; and wherein the electrically-operated components of each of the electrohydraulic modules include: a valve in communication with the control system, the electrical power source, and the hydraulic reservoir to selectively allow and prevent flow of hydraulic fluid from and to the hydraulic reservoir; and a motor in communication with the control system, the electrical power source and the hydraulic pump to affect operation of the hydraulic pump.

3. The system of example 1, further comprising a main hydraulic reservoir for containing hydraulic fluid and a main hydraulic pump in communication with the main hydraulic reservoir; wherein the main hydraulic pump is in communication with at least one hydraulic component of the agricultural combine to affect operation of the at least one hydraulic component; and wherein the at least one hydraulic component, the main hydraulic reservoir, and the main hydraulic pump of the combine is hydraulically isolated from the hydraulic components of the plurality of electrohydraulic modules.

4. The system of example 3, wherein at least one of the hydraulic components of each of the plurality of electrohydraulic modules is a hydraulic pump, wherein a main pressure provided by the main hydraulic pump is greater than module pressures of the hydraulic pumps of the plurality of electrohydraulic modules.

5. The system of example 1, wherein the plurality of electrohydraulic modules are located in a group comprised of a grain tank zone, a separator zone, an engine deck zone, a feederhouse zone, a body zone, and a header zone.

6. The system of example 1, wherein the agricultural combine further comprises a first header and a second header; and wherein the first header and the second header are interchangeably coupled to the combine.

7. The system of example 6, wherein one of the plurality of electrohydraulic modules is a first header module associated with the first header and a second header module associated with the second header, wherein the first header module and the second header module are interchangeably electrically coupled to the electrical power source.

8. The system of example 7, wherein the hydraulic components of each of the first header module and second header module include a hydraulic reservoir, a hydraulic pump, and a hydraulic actuator, and wherein the electrically-operated components of each of the first header module and the second header module include a valve and a motor, wherein the hydraulic components and the electrically-operated components of the first header module or the second header module are supported on a respective one of the first header or the second header.

9. The system of example 1, wherein each of the plurality of electrohydraulic modules includes a sensor configured to sense at least one of a pressure of hydraulic fluid and a position of at least one of the one or more hydraulic components in the plurality of electrohydraulic modules.

10. The system of example 1, wherein at least one of the plurality of electrohydraulic modules includes at least one hydraulic line to facilitate flow of hydraulic fluid within the at least one of the plurality of electrohydraulic modules; and wherein the at least one hydraulic line in the at least one of the plurality of electrohydraulic modules is solely positioned in the respective electrohydraulic module and does not extend into any other of the electrohydraulic modules.

11. An agricultural combine comprising: a chassis; an engine supported by the chassis and configured to power a plurality of wheels to affect movement of the agricultural combine; an electrical power source supported by the chassis; a header coupled to the chassis and configured to harvest an agricultural crop; and a distributed electrohydraulic system including: a plurality of electrohydraulic modules each of which includes one or more hydraulic components and one or more electrically-operated components configured to affect an operation of the one or more hydraulic components, the one or more hydraulic components of each of the plurality of electrohydraulic modules being hydraulically isolated from the one or more hydraulic components of another one of the plurality of electrohydraulic modules, and the one or more electrically-operated components of each of the plurality of electrohydraulic modules being electrically coupled to the electrical power source to receive electrical power; and a control system including one or more processors and memory devices electrically coupled to the electrical power source and the one or more electrically-operated components of the plurality of electrohydraulic modules, the control system being configured to execute control commands to operate independently the one or more electrically-operated components of each of the plurality of electrohydraulic modules.

12. The agricultural combine of example 11, wherein the hydraulic components of each of the plurality of electrohydraulic modules includes: a hydraulic reservoir for containing hydraulic fluid; a hydraulic pump in communication with the hydraulic reservoir; and a hydraulic actuator coupled to the hydraulic pump, wherein the hydraulic actuator is moveable by the hydraulic pump between a first position and a second position; and wherein the electrically-operated components of each of the electrohydraulic modules includes: a valve in communication with the control system, the electrical power source, and the hydraulic reservoir to selectively allow and prevent flow of hydraulic fluid from and to the hydraulic reservoir; and a motor in communication with the control system, the electrical power source and the hydraulic pump to affect operation of the hydraulic pump.

13. The agricultural combine of example 11, further comprising a main hydraulic reservoir for containing hydraulic fluid and a main hydraulic pump in communication with the main hydraulic reservoir; wherein the main hydraulic pump is in communication with at least one hydraulic component of the agricultural combine to affect operation of the at least one hydraulic component; and wherein the at least one hydraulic component, the main hydraulic reservoir, and the main hydraulic pump of the combine is hydraulically isolated from the hydraulic components of the plurality of electrohydraulic modules.

14. The agricultural combine of example 13, wherein at least one of the hydraulic components of each of the plurality of electrohydraulic modules is a hydraulic pump, wherein a main pressure provided by the main hydraulic pump is greater than module pressures of the hydraulic pumps of the plurality of electrohydraulic modules.

15. The agricultural combine of example 11, wherein the plurality of electrohydraulic modules are located in a group comprised of a grain tank zone, a separator zone, an engine deck zone, a feederhouse zone, a body zone, and a header zone.

16. The agricultural combine of example 11, wherein the agricultural combine further comprises a first header and a second header; and wherein the first header and the second header are interchangeably coupled to the combine.

17. The agricultural combine of example 16, wherein one of the plurality of electrohydraulic modules is a first header module associated with the first header and a second header module associated with the second header, wherein the first header module and the second header module are interchangeably electrically coupled to the electrical power source.

18. The agricultural combine of example 17, wherein the hydraulic components of each of the first header module and second header module include a hydraulic reservoir, a hydraulic pump, and a hydraulic actuator, and wherein the electrically-operated components of each of the first header module and the second header module include a valve and a motor, wherein the hydraulic components and the electrically-operated components of the first header module or the second header module are supported on a respective one of the first header or the second header.

19. The agricultural combine of example 11, wherein each of the plurality of electrohydraulic modules includes a sensor configured to sense at least one of a pressure of hydraulic fluid and a position of at least one of the one or more hydraulic components in the plurality of electrohydraulic modules.

20. The agricultural combine of example 11, wherein at least one of the plurality of electrohydraulic modules includes at least one hydraulic line to facilitate flow of hydraulic fluid within the at least one of the plurality of electrohydraulic modules; and wherein the at least one hydraulic line in the at least one of the plurality of electrohydraulic modules is solely positioned in the respective electrohydraulic module and does not extend into any other of the electrohydraulic modules.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A distributed electrohydraulic system (120) for an agricultural combine (20), the system (120) comprising:
   an electrical power source (29);
   a plurality of electrohydraulic modules (122, 124, 126, 128, 130, and 132) each of which includes one or more hydraulic components (134) and one or more electrically-operated components (136) configured to control operation of the one or more hydraulic components (134), including a hydraulic actuator (142), each of the plurality of electrohydraulic modules (122, 124, 126, 128, 130, and 132) forms a separate and distinct hydraulic circuit that does not interface hydraulically with another of the plurality of electrohydraulic modules (122, 124, 126, 128, 130, and 132), the one or more hydraulic components (134) of each of the plurality of electrohydraulic modules (122, 124, 126, 128, 130, and 132) being hydraulically isolated from the one or more hydraulic components (134) of the other of the plurality of electrohydraulic modules (122, 124, 126, 128, 130, and 132), and the one or more electrically-operated components (136) of each of the plurality of electrohydraulic modules (122, 124, 126, 128, 130, and 132) being electrically coupled to the electrical power source (29) to receive electrical power; and
   a control system (102) including one or more processors (105) and memory devices (107) electrically coupled to the electrical power source (29) and the one or more electrically-operated components (136) of the plurality of electrohydraulic modules (122, 124, 126, 128, 130, and 132), the control system (102) being configured to execute control commands to operate independently the one or more electrically-operated components (136) of each of the plurality of electrohydraulic modules (122, 124, 126, 128, 130, and 132).

2. The system (120) of claim 1, wherein the hydraulic components (134) of each of the plurality of electrohydraulic modules (122, 124, 126, 128, 130, and 132) include:
   a hydraulic reservoir (138) for containing hydraulic fluid; and
   a hydraulic pump (140) in communication with the hydraulic reservoir (138);
   wherein the hydraulic actuator (142) is coupled to the hydraulic pump (140) and is moveable by the hydraulic pump (140) between a first position and a second position; and
   wherein the electrically-operated components (136) of each of the electrohydraulic modules include:
      a valve in communication with the control system (102), the electrical power source (29), and the hydraulic reservoir (138) to selectively allow and prevent flow of hydraulic fluid from and to the hydraulic reservoir (138); and
      a motor in communication with the control system (102), the electrical power source (29) and the hydraulic pump (140) to affect operation of the hydraulic pump (140).

3. The system (120) of claim 1, further comprising a main hydraulic reservoir (148) for containing hydraulic fluid and a main hydraulic pump (150) in communication with the main hydraulic reservoir (148);
   wherein the main hydraulic pump (150) is in communication with at least one hydraulic component (134) of the agricultural combine (20) to affect operation of the at least one hydraulic component (134); and
   wherein the at least one hydraulic component (134), the main hydraulic reservoir (148), and the main hydraulic pump (150) of the combine (20) are hydraulically isolated from the hydraulic components (134) of the plurality of electrohydraulic modules (122, 124, 126, 128, 130, and 132).

4. The system (120) of claim 3, wherein at least one of the hydraulic components (134) of each of the plurality of electrohydraulic modules (122, 124, 126, 128, 130, and 132) is a hydraulic pump (140), and wherein a main pressure provided by the main hydraulic pump (150) is greater than module pressures of the hydraulic pumps (140) of the plurality of electrohydraulic modules (122, 124, 126, 128, 130, and 132).

5. The system (120) of claim 1, wherein the plurality of electrohydraulic modules (122, 124, 126, 128, 130, and 132) are located in a group comprised of a grain tank zone (112), a separator zone (108), an engine deck zone (114), a feederhouse zone (106), a body zone (110), and a header zone (104).

6. The system (120) of claim 1, wherein the agricultural combine (20) further comprises a first header (30a) and a second header (30b); and
wherein the first header (30a) and the second header (30b) are interchangeably coupled to the combine (20).

7. The system (120) of claim 6, wherein one of the plurality of electrohydraulic modules (122, 124, 126, 128, 130, and 132) is a first header module (122a) associated with the first header (30a) and a second header module (122b) associated with the second header (30b), and wherein the first header module (122a) and the second header module (122b) are interchangeably electrically coupled to the electrical power source (29).

8. The system (120) of claim 7, wherein the hydraulic components (134) of each of the first header module (122a) and second header module (122b) include a hydraulic reservoir (138), a hydraulic pump (140), and the hydraulic actuator (142), wherein the electrically-operated components (136) of each of the first header module (122a) and the second header module (122b) include a valve (144) and a motor (146), and wherein the hydraulic components (134) and the electrically-operated components (136) of the first header module (122a) or the second header module (122b) are supported on a respective one of the first header (30a) or the second header (30b).

9. The system (120) of claim 1, wherein each of the plurality of electrohydraulic modules (122, 124, 126, 128, 130, and 132) includes a sensor (135) configured to sense one or more of a pressure of hydraulic fluid and a position of at least one of the one or more hydraulic components (134) in the plurality of electrohydraulic modules (122, 124, 126, 128, 130, and 132).

10. The system (120) of claim 1, wherein at least one of the plurality of electrohydraulic modules (122, 124, 126, 128, 130, and 132) includes at least one hydraulic line (137) to facilitate flow of hydraulic fluid within the at least one of the plurality of electrohydraulic modules (122, 124, 126, 128, 130, and 132); and
wherein the at least one hydraulic line (137) in the at least one of the plurality of electrohydraulic modules (122, 124, 126, 128, 130, and 132) is solely positioned in the respective electrohydraulic module (122, 124, 126, 128, 130, and 132) and does not extend into any other of the electrohydraulic modules (122, 124, 126, 128, 130, and 132).

11. An agricultural combine (20) comprising:
a chassis (22);
an engine (28) supported by the chassis (22) and configured to power a plurality of wheels (24) to affect movement of the agricultural combine (20);
an electrical power source (29) supported by the chassis (22);
a header (30) coupled to the chassis (22) and configured to harvest an agricultural crop; and
a distributed electrohydraulic system (120) including:
a plurality of electrohydraulic modules (122, 124, 126, 128, 130, and 132) each of which includes one or more hydraulic components (134) and one or more electrically-operated components (136) configured to control operation of the one or more hydraulic components (134), including a hydraulic actuator (142), each of the plurality of electrohydraulic modules (122, 124, 126, 128, 130, and 132) forms a separate and distinct hydraulic circuit that does not interface hydraulically with another of the plurality of electrohydraulic modules (122, 124, 126, 128, 130, and 132), the one or more hydraulic components (134) of each of the plurality of electrohydraulic modules (122, 124, 126, 128, 130, and 132) being hydraulically isolated from the one or more hydraulic components (134) of the other of the plurality of electrohydraulic modules (122, 124, 126, 128, 130, and 132), and the one or more electrically-operated components (136) of each of the plurality of electrohydraulic modules (122, 124, 126, 128, 130, and 132) being electrically coupled to the electrical power source (29) to receive electrical power; and
a control system (102) including one or more processors (105) and memory devices (107) electrically coupled to the electrical power source (29) and the one or more electrically-operated components (136) of the plurality of electrohydraulic modules (122, 124, 126, 128, 130, and 132), the control system (102) being configured to execute control commands to operate independently the one or more electrically-operated components (136) of each of the plurality of electrohydraulic modules (122, 124, 126, 128, 130, and 132).

12. The agricultural combine (20) of claim 11, wherein the hydraulic components (134) of each of the plurality of electrohydraulic modules (122, 124, 126, 128, 130, and 132) include:
a hydraulic reservoir (138) for containing hydraulic fluid; and
a hydraulic pump (140) in communication with the hydraulic reservoir (138);
wherein the hydraulic actuator (142) is coupled to the hydraulic pump (140) and is moveable by the hydraulic pump (140) between a first position and a second position; and
wherein the electrically-operated components (136) of each of the electrohydraulic modules (122, 124, 126, 128, 130, and 132) include:
a valve (144) in communication with the control system (102), the electrical power source (29), and the hydraulic reservoir (138) to selectively allow and prevent flow of hydraulic fluid from and to the hydraulic reservoir (138); and
a motor in communication with the control system (102), the electrical power source (29) and the hydraulic pump (140) to affect operation of the hydraulic pump (140).

13. The agricultural combine (20) of claim 11, further comprising a main hydraulic reservoir (148) for containing hydraulic fluid and a main hydraulic pump (150) in communication with the main hydraulic reservoir (148);
wherein the main hydraulic pump (150) is in communication with at least one hydraulic component (134) of the agricultural combine (20) to affect operation of the at least one hydraulic component (134); and
wherein the at least one hydraulic component (134), the main hydraulic reservoir (148), and the main hydraulic pump (150) of the combine (20) are hydraulically isolated from the hydraulic components (134) of the plurality of electrohydraulic modules (122, 124, 126, 128, 130, and 132).

14. The agricultural combine (20) of claim 13, wherein at least one of the hydraulic components (134) of each of the plurality of electrohydraulic modules (122, 124, 126, 128, 130, and 132) is a hydraulic pump (140), and wherein a main pressure provided by the main hydraulic pump (150) is greater than module pressures of the hydraulic pumps (140) of the plurality of electrohydraulic modules (122, 124, 126, 128, 130, and 132).

15. The agricultural combine (20) of claim 11, wherein the plurality of electrohydraulic modules (122, 124, 126, 128, 130, and 132) are located in a group comprised of a grain tank zone (112), a separator zone (108), an engine deck zone (114), a feederhouse zone (106), a body zone (110), and a header zone (104).

16. The agricultural combine (20) of claim 11, wherein the agricultural combine (20) further comprises a first header (30a) and a second header (30b); and
wherein the first header (30a) and the second header (30b) are interchangeably coupled to the combine (20).

17. The agricultural combine (20) of claim 16, wherein one of the plurality of electrohydraulic modules (122, 124, 126, 128, 130, and 132) is a first header module (122a) associated with the first header (30a) and a second header module (122b) associated with the second header (30b), and wherein the first header module (122a) and the second header module (122b) are interchangeably electrically coupled to the electrical power source (29).

18. The agricultural combine (20) of claim 17, wherein the hydraulic components (134) of each of the first header module (122a) and second header Iowa City, Iowa module (122b) include a hydraulic reservoir (138), a hydraulic pump (140), and the hydraulic actuator (142), wherein the electrically-operated components (136) of each of the first header module (122a) and the second header module (122b) include a valve (144) and a motor (146), and wherein the hydraulic components (134) and the electrically-operated components (136) of the first header module (122a) or the second header module (122b) are supported on a respective one of the first header (30a) or the second header (30b).

19. The agricultural combine (20) of claim 11, wherein each of the plurality of electrohydraulic modules (122, 124, 126, 128, 130, and 132) includes a sensor (135) configured to sense one or more of a pressure of hydraulic fluid and a position of at least one of the one or more hydraulic components (134) in the plurality of electrohydraulic modules (122, 124, 126, 128, 130, and 132).

20. The agricultural combine (20) of claim 11, wherein at least one of the plurality of electrohydraulic modules (122, 124, 126, 128, 130, and 132) includes at least one hydraulic line (137) to facilitate flow of hydraulic fluid within the at least one of the plurality of electrohydraulic modules (122, 124, 126, 128, 130, and 132); and
wherein the at least one hydraulic line (137) in the at least one of the plurality of electrohydraulic modules (122, 124, 126, 128, 130, and 132) is solely positioned in the respective electrohydraulic module (122, 124, 126, 128, 130, and 132) and does not extend into any other of the electrohydraulic modules (122, 124, 126, 128, 130, and 132).

\* \* \* \* \*

UNITED STATES PATENT AND TRADEMARK OFFICE
CERTIFICATE OF CORRECTION

| | | |
|---|---|---|
| PATENT NO. | : 11,178,819 B2 | Page 1 of 1 |
| APPLICATION NO. | : 16/256503 | |
| DATED | : November 23, 2021 | |
| INVENTOR(S) | : Paul D. Marvin | |

It is certified that error appears in the above-identified patent and that said Letters Patent is hereby corrected as shown below:

In the Claims

In Column 19, Claim 18, Line 25, delete "Iowa City, Iowa", therefor.

Signed and Sealed this
Thirty-first Day of December, 2024

Derrick Brent
*Acting Director of the United States Patent and Trademark Office*